United States Patent

[11] 3,588,539

[72] Inventors Arnaldo Vicentini
Milan;
Demetrio Sonaglioni, Ramo Arnaldi, Italy
[21] Appl. No. 835,374
[22] Filed June 23, 1969
[45] Patented June 28, 1971
[73] Assignee Societa Italiana Telecomunicazioni Siemens S.p.a.
Milan, Italy
[32] Priority June 26, 1968
[33] Italy
[31] 18231A

[54] GATING NETWORK FOR TIME-SHARING COMMUNICATION SYSTEM
6 Claims, 5 Drawing Figs.

[52] U.S. Cl. ........ 307/246, 307/257, 307/255
[51] Int. Cl. ........ H03k 17/00
[50] Field of Search ........ 307/246, 257, 254, 255

[56] References Cited
UNITED STATES PATENTS 3,292,010 12/1966 Brown et al. ........ 307/246

*Primary Examiner*—Donald D. Forrer
*Assistant Examiner*—B. P. Davis
*Attorney*—Karl F. Ross ABSTRACT: A gating network for intermittently connecting a signal generator to a load, e.g. for use in a time-sharing telecommunication system, includes a normally blocked primary bridge circuit formed by four diodes, or by the emitter-base and collector-base circuits of two complementary transistors connected in tandem, whose output diagonal is in series with the signal path and whose input diagonal is connected between intermediate points of two nonadjoining high-resistance arms of a secondary bridge circuit also having two low-resistance arms. All the arms of the secondary bridge circuit include diodes having the same orientation with reference to an input diagonal of that circuit which is connected across a source of reversible DC voltage; when the output voltage of that source is of a first polarity, a condenser connected across the output diagonal of the secondary bridge is charged, whereas upon reversal of that voltage the condenser is discharged through the primary bridge to bias it into a state of conductivity.

Arnaldo Vicentini
Demetrio Sonaglioni
INVENTORS.

BY

Karl F. Ross
Attorney

GATING NETWORK FOR TIME-SHARING COMMUNICATION SYSTEM

Our present invention relates to a gating network for temporarily closing a communication path between a signal generator and a load, e.g. as used in telephone and other message-transmitting systems operating on the principles of shared time.

In commonly assigned application Ser. No. 742,837, filed July 5, 1968 by Ferdinando Formenti, and in corresponding Italian patent No. 804,897 there has been disclosed a circuit arrangement of this general type in which the closure of such a signal path is effected by the discharge of a condenser through a biasing resistance common to a pair of transistors connected back to back, the condenser having a charging circuit which is closed during a blocking period and is open during an unblocking period in which a normally open discharge circuit through the biasing resistance is closed. The charging circuit of the condenser is shown to include, in a specific embodiment, a pair of ancillary transistors of mutually opposite conductivity types, i.e. PNP and NPN, which are periodically triggered in a circuit including sources of positive and negative driving voltages for the two ancillary transistors.

Although a system of this description responds rapidly and cleanly to the appearance and disappearance of a command pulse whose duration may be on the order of microseconds and which may recur with a cadence on the order of milliseconds, a drawback resides in the fact that the positive and negative driving voltages must be referred to ground (or to some other fixed reference potential) for proper control of the associated transistors. As a consequence, the signals to be gated must also bear a predetermined relationship with this reference potential since otherwise their selective interruption and transmission would not be assured even if the signal amplitude were only a fraction of the difference between the two driving voltages.

Thus, the general object of our present invention is to provide an improved gating network of the aforedescribed character which can be operated also with "floating" signals, i.e. with signals bearing no predetermined relationship with any fixed reference potential, so long as the voltage swing of these signals remains below a predetermined magnitude.

Another object of our invention is to provide means in such network for minimizing the consumption of electrical energy resulting from the flow of a biasing current during the period of closure.

We have found, in accordance with our present invention, that the aforestated objects can be realized by the provision of a primary bridge circuit with four unidirectionally conductive arms defining an output diagonal, connected between the signal generator and the load, and an input diagonal, connected between intermediate points on a pair of nonadjoining arms of a secondary bridge circuit having a capacitance connected across its own output diagonal. These nonadjoining arms include respective diodes and resistances whose junctions constitute the aforementioned intermediate points; the two remaining arms of the secondary bridge are formed substantially exclusively by diodes, the input diagonal of that bridge being connected across a source of reversible DC voltage whose polarity determines the conductive or nonconductive stage of the first bridge. The diodes of the second bridge are all connected with the same orientation between the terminals of the reversible-voltage source so as to be all forwardly biased when that voltage is of a given polarity. In that condition, the capacitance is charged through the low-resistance bridge arms while the rectifying portions of the other two bridge arms constitute a low-resistance path for impressing the source voltage upon the first bridge in a signal-blocking sense. Upon the subsequent inversion of the polarity of the source, all the diodes of the second bridge are reverse-biased so that the charging circuit of the capacitance and the blocking circuit for the first bridge are virtually interrupted, the capacitance thereupon discharging through the first bridge by way of the resistive portions of the high-resistance arms of the second bridge to bias the first bridge into an unblocked condition.

The resistances just referred to need not be passive impedances but may be of the dynamic type, constituted advantageously by respective transistors which during the blocking period are biased to cutoff and in the unblocking period become sufficiently conductive to provide the necessary forward bias for the arms of the first bridge. The latter arms may be constituted simply by diodes or may be formed by the base-emitter and base-collector circuits of two complementary transistors connected in tandem.

The above and other features of our invention will be described in greater detail hereinafter with reference to the accompanying drawing in which.

Figure 1:
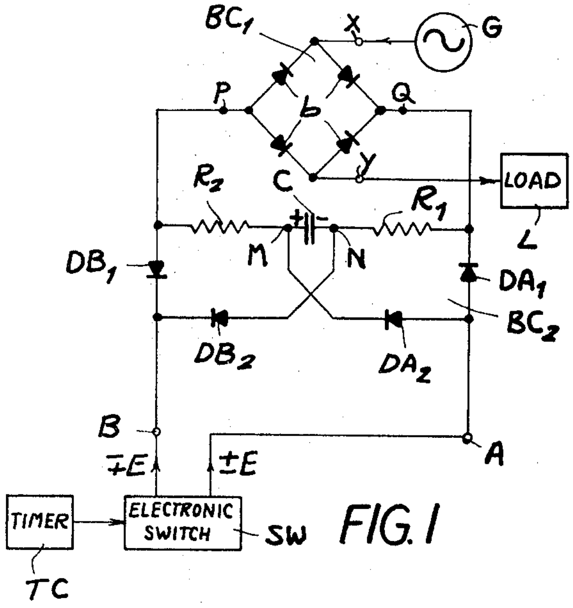
FIG. 1 is a circuit diagram of a gating network embodying our invention.
Figure 5:
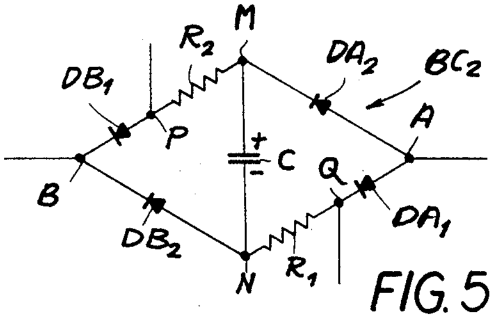
FIG. 5 is an equivalent circuit diagram for part of the network of FIG. 1.

In FIG. 1 we have shown a system comprising a first bridge $BC_1$ and a second bridge $BC_2$, the equivalent circuit of the latter bridge being illustrated in FIG. 5. Bridge $BC_1$ comprises four arms constituted by respective diodes $b$ all connected in the conventional manner between an input diagonal P—Q and an output diagonal X—Y. Terminals X and Y are respectively connected to a signal generator G and a load L; generator G may be a modulator producing a carrier modulated by voice-frequency currents from a subscriber line whereas load L may be the input end of a transmission channel common to a multiplicity of such signal generators. The output signal of generator G is to be applied to load L only during a very brief sampling interval representing a small fraction of an operating cycle during which all the signal generators are consecutively sampled.

Bridge circuit $BC_2$ has an input diagonal A—B and an output diagonal M—N, a condenser C being connected across the latter diagonal. Input diagonal A—B is connected across a source of reversible DC voltage +E, −E having the potential spread 2E, this source being here shown as an electronic switch SW (such as a multivibrator consisting of two transistors of opposite conductivity types) controlled by a timer or clock circuit TC. The four arms of bridge $BC_2$ include two high-resistance arms, i.e. an arm A-N constituted by a diode $DA_1$ in series with a resistance $R_1$ and an arm M-B constituted by a resistance $R_2$ in series with a diode $DB_1$, and a pair of low-resistance arms A-M and N-B constituted by respective diodes $DA_2$ and $DB_2$. The input terminals P and Q of bridge $BC_1$ are tied to the junctions of resistor $R_2$ with diode $DB_1$ and resistor $R_1$ with diode $DA_1$, respectively. The four diodes $DA_1$, $DA_2$, $DB_1$, $DB_2$ are forwardly biased when terminal A is positive and terminal B is negative, terminal A being connected to the anodes of diodes $DA_1$, $DB_2$ while terminal B is connected to the cathodes of diodes $DB_1$, $DB_2$. This forward bias enables the condenser C to be charged, with the polarity indicated in FIGS. 1 and 5, through diodes $DA_2$ and $DB_2$, thus in a low-resistance path of relatively small time constant. At the same time, positive potential on terminal A and negative potential on terminal B are directly communicated to terminals Q and P, respectively, of bridge $BC_1$ whereby this bridge is blocked for signal transmission from generator G to load L. It will be noted that this blocking effect is independent of the relationship between the output voltage of signal generator G and ground or any other point of fixed reference potential.

When the polarity of the output of switch SW is reversed, condenser C discharges via a path extending from terminal M through resistor $R_2$, input diagonal P—Q of bridge $BC_1$, resistor $R_1$ to terminal N, this path having a relatively large time constant determined by the magnitudes of resistances $R_1$, $R_2$. The magnitude of the discharge current sets the limit for the maximum signal current to be passed by bridge $BC_1$. Since this signal current otherwise depends only on the voltage difference between generator G and load L, the load is energized independently of the absolute magnitude of the generator voltage.

Figure 2:
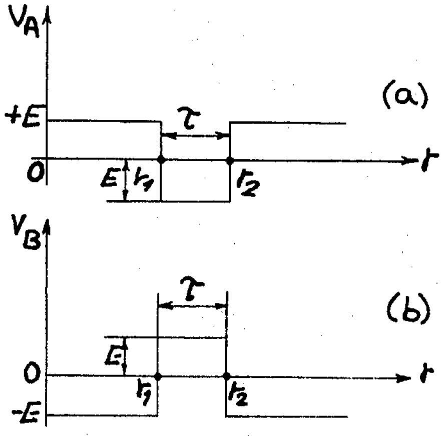
FIG. 2 is a pair of graphs serving to explain the mode of operation of the system of FIG. 1.

Graph (a), Fig. 2, shows the voltage $V_A$ of terminal A whereas graph (b) shows the voltage $V_B$ of terminal B. Again, only the difference between these voltages is significant even though, for convenience, they have been shown balanced with reference to ground. Terminals A and B retain their respective blocking potentials +E, −E for an initial period from time $t=o$ to an instant $t=t$, which represents the leading edge of a switching pulse initiated by a command signal from timer TC (FIG. 1). This switching pulse lasts for a short period $\tau$, e.g. of 1 microsecond, during which condenser C partly discharges as voltage $V_A$ assumes the value −E whereas voltage $V_B$ attains the value +E. At an instant $t_2$, corresponding to the trailing edge of the switching pulse, the original condition is restored with interruption of the signal current which flows during the unblocking interval $\tau$; condenser C, FIG. 1, thereupon promptly recharges via diodes $DA_2$ and $DB_2$.

Resistances $R_1$ and $R_2$ in FIG. 1 must be large enough to minimize the leakage current which, during the blocking interval, flows in the loop M–B–A–N and reduces the energy available for charging the condenser C. On the other hand, these resistances must allow for the passage of a discharge current of sufficient magnitude during the unblocking interval, i.e. when the circuit from generator G to load L is to be closed. This problem is simplified in the embodiment of FIG. 3 in which the bridge $BC_2$ has been replaced by a bridge $BC_2'$ having transistors $T_1$ and $T_2$, respectively of PNP and NPN type, connected between terminals Q, N and M, P in lieu of the resistors $R_1$, $R_2$ of FIG. 1. Transistor $T_1$ has its emitter and collector connected to points Q and N, respectively, its base being returned to point N through a resistor $R_{T1}$. Similarly, transistor $T_2$ has its emitter and collector connected to points P and M, respectively, its base being returned to point M through a resistor $R_{T2}$. Terminals A and B are also connected to the bases of transistors $T_1$, $T_2$, respectively, by way of additional diodes $DA_3$, $DB_3$ having the same orientation as the remaining diodes of bridge $BC_2'$ so as to be forwardly biased when terminal A is driven positive with reference to terminal B.

Figure 3:
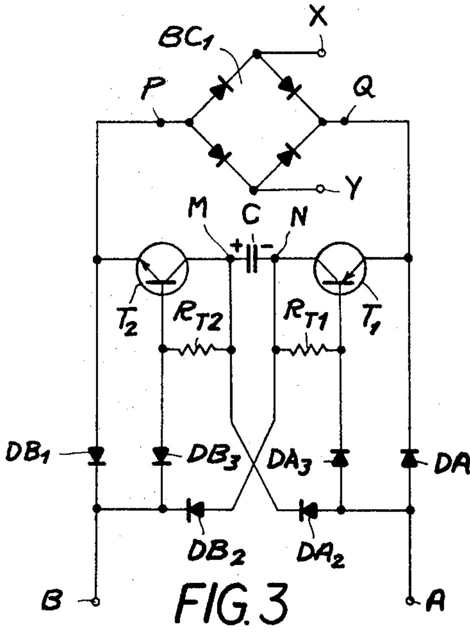
FIGS. 3 and 4 are circuit diagrams similar to FIG. 1 representing respective modification.

In the blocking condition of the network of FIG. 3, in which condenser C again charges with the polarity indicated in the drawing, both transistors $T_1$ and $T_2$ are biased to cutoff. When the polarity of the input voltage at terminals A and B reverses, the biasing potential applied by condenser C to the transistor bases renders these transistors conductive for a controlled discharge of condenser C through bridge $BC_1$.

Figure 4:
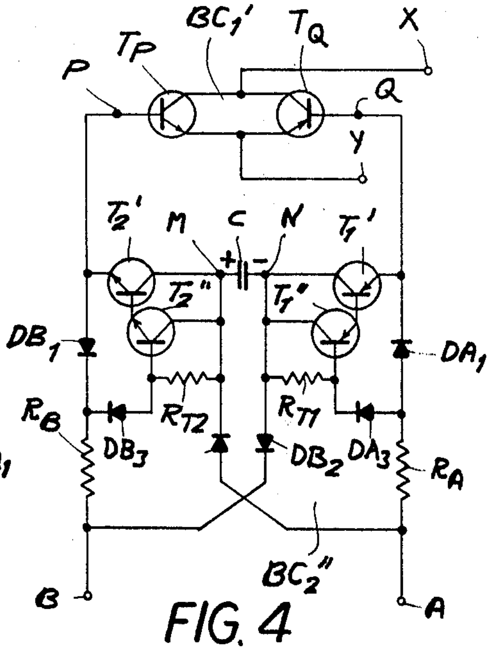

In FIG. 4 we have shown a modified first bridge $BC_1'$ cooperating with a modified second bridge $BC_2''$. The arms of bridge $BC_1'$ are formed by the base-collector and base-emitter resistances of two complementary transistors $T_P$ and $T_Q$ having their bases tied to terminals B and Q, respectively, their collectors being joined at terminal X while their emitters together form the terminal Y. With transistor $T_P$ of the NPN type and transistor $T_Q$ of the PNP type, these transistors are effectively connected in tandem for the flow of unblocking current from point P to point Q.

Bridge $BC_2''$ differs from bridge $BC_2'$ of the preceding embodiment in that the one-stage transistors $T_1$, $T_2$ of FIG. 3 have been replaced by the second stages $T_1'$, $T_2'$ of respective two-stage transistors whose first stages $T_1''$, $T_2''$ have their emitters connected to the bases of stages $T_1'$, $T_2'$ and are in turn biased by resistors $R_{T1}$, $R_{T2}$ as well as diodes $DA_3$, $DB_3$. An additional resistor $R_A$ is inserted between terminal A and the anodes of diodes $DA_1$ and $DA_3$; a similar resistor $R_B$ lies between terminal B and the cathodes of diodes $DB_1$ and $DB_3$.

In FIG. 3, the effective discharging resistance of bridge $BC_2'$ is determined by the current gains of transistors $T_1$ and $T_2$ and can therefore be much lower than the resistances $R_1$, $R_2$ of FIG. 1 so that the charging potential of condenser C can be correspondingly reduced for a given biasing current. The use of two-stage transistors in accordance with FIG. 4 intensifies the current gain and, therefore, still further reduces the expenditure of switching energy. The presence of transistors $T_P$, $T_Q$ in bridge circuit $BC_1$ of FIG. 4 allows the signal current to be much greater than the biasing current drawn from condenser C, as determined by the parameters of these transistors which preferably have the same current gain.

We claim:

1. A gating network for intermittently connecting a signal generator to a load, comprising:

a primary bridge circuit with four unidirectionally conductive arms defining a normally blocked first output diagonal connected between said signal generator and load and further defining a first input diagonal adapted to unblock said first output diagonal upon application of a voltage difference of predetermined polarity thereacross;

a secondary bridge circuit with four unidirectionally conductive arms including a pair of nonadjoining high-resistance arms and a pair of nonadjoining low-resistance arms defining a second output diagonal and a second input diagonal, said high-resistance arms each comprising resistance means closer to said second output diagonal and series diode means closer to said second input diagonal, said first input diagonal having terminals tied to the junctions of said resistance means and said diode means of said high-resistance arms, respectively, said low-resistance arms each comprising other diode means;

a capacitance connected across said second output diagonal;

and a source of reversible DC voltage connected across said second input diagonal for charging said capacitance upon said voltage being of a given polarity, said series diode means and said other diode means being connected in the arms of said secondary bridge circuit with the same orientation relative to said source for reverse biasing upon said voltage being of an alternate polarity whereby said capacitance discharges through said resistance means by way of said first input diagonal, the arms of said primary bridge circuit being poled for unblocking said first output diagonal in response to the flow of discharge current from said capacitance.

2. A gating network as defined in claim 1 wherein said resistance means comprises a pair of transistors of opposite conductivity types in said high-resistance arms, said transistors having input circuits connected across parts of said secondary bridge circuit in a sense to cut off said transistors in the presence of said given polarity and to render said transistors conductive in the presence of said alternate polarity.

3. A gating network as defined in claim 2 wherein said input circuits include additional transistor stages.

4. A gating network as defined in claim 2 wherein said input circuits include further diode means connected to said source with the same orientation as said series diode means and said other diode means.

5. A gating network as defined in claim 1 wherein the arms of said primary bridge circuit are diodes.

6. A gating network as defined in claim 1 wherein the arms of said primary bridge circuit are formed by base-emitter and base-collector circuits of two tandem-connected complementary transistors.